INVENTOR
NILS HOGLUND
By William A. Zalesak
ATTORNEY

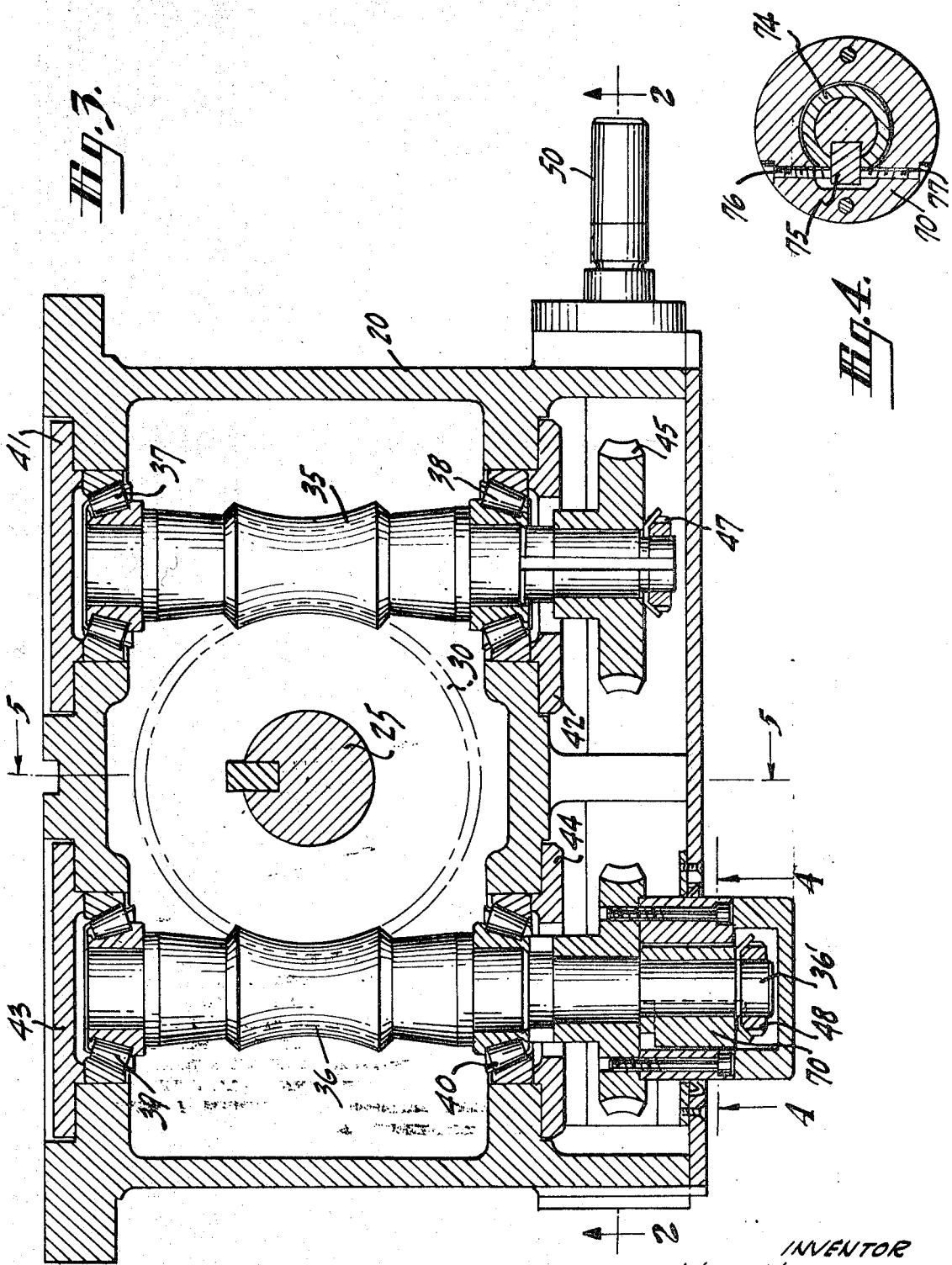

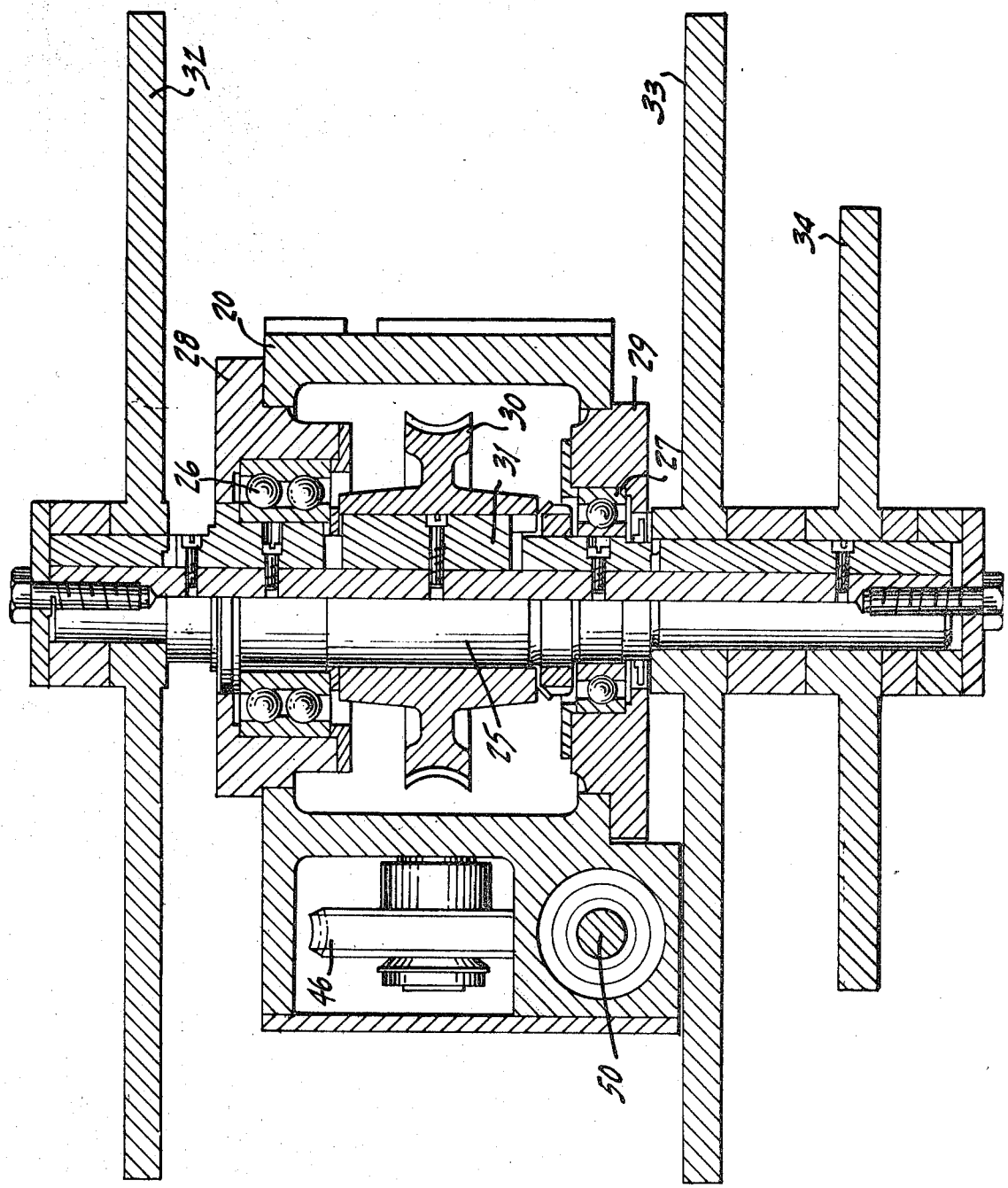

United States Patent Office 3,554,044
Patented Jan. 12, 1971

3,554,044
BACK LASH FREE POWER TRANSFER MECHANISM
Nils Hoglund, Short Hills, N.J., assignor to Tri-Ordinate Corporation, Berkeley Heights, N.J.
Filed June 24, 1969, Ser. No. 836,003
Int. Cl. F16h 1/18, 37/06, 55/18
U.S. Cl. 74—409                                           3 Claims

ABSTRACT OF THE DISCLOSURE

The apparatus is intended primarily for transferring power from a prime mover to another mechanism, for example, accurately made cams where back lash must be minimal or preferably entirely eliminated.

The mechanism includes a power input shaft with spaced right and left hand worm gears mounted thereon. The main cam shaft is provided with a worm wheel engaged on opposite sides thereof by hour glass worms having attached thereto worm wheels engaging the worm gears on the power input shaft. One of the worm gears is fixed to its hour glass worm. However, the other is rotatably adjustable to take up the back lash at which point it can be fixed by set screws in a collar fixed to the worm gear.

BACKGROUND OF THE INVENTION

In certain types of applications, for example where a plurality of rotatable relatively fixed cams must be precisely rotated simultaneously to accurately operate a plurality of slides, for example which control the movement of a tool through a predetermined path and where accuracy is measured to ten thousandths of an inch or less, it is important that back lash in the driving mechanism or gear train connected to a prime mover be substantially eliminated.

In certain applications where the cams being rotated by a common shaft, for example, have sharp contours and where followers are biased against the cams, as the cams rotate, let us say in a clockwise rotation, a force may be exerted on the cam shaft by a cam in a counter-clockwise direction up to a high point of the cam. When the high point is passed, the force on the shaft due to the biased follower will cause a force on the shaft in the opposite direction or in a clockwise direction as the shaft continues rotation. If any back lash is present in the gear train, obviously the cams will move faster than their prescribed rate of rotation after the high point is passed until the back lash is taken up. This could cause serious deviation in a tool path and inaccurate contours to be formed on a workpiece.

BRIEF DESCRIPTION OF THE DRAWINGS

The invention will be described in connection with the accompanying drawings showing one embodiment of my invention:

FIG. 1a is an exploded perspective of a portion of FIG. 1 showing details of construction;
FIG. 3 is a section taken along the line 3—3 of FIG. 2;
FIG. 4 is a section taken along the line 4—4 of FIG. 3;
FIG. 5 is a section taken along the line 5—5 of FIG. 3.

DESCRIPTION OF THE PREFERRED EMBODIMENT

Figure 1:
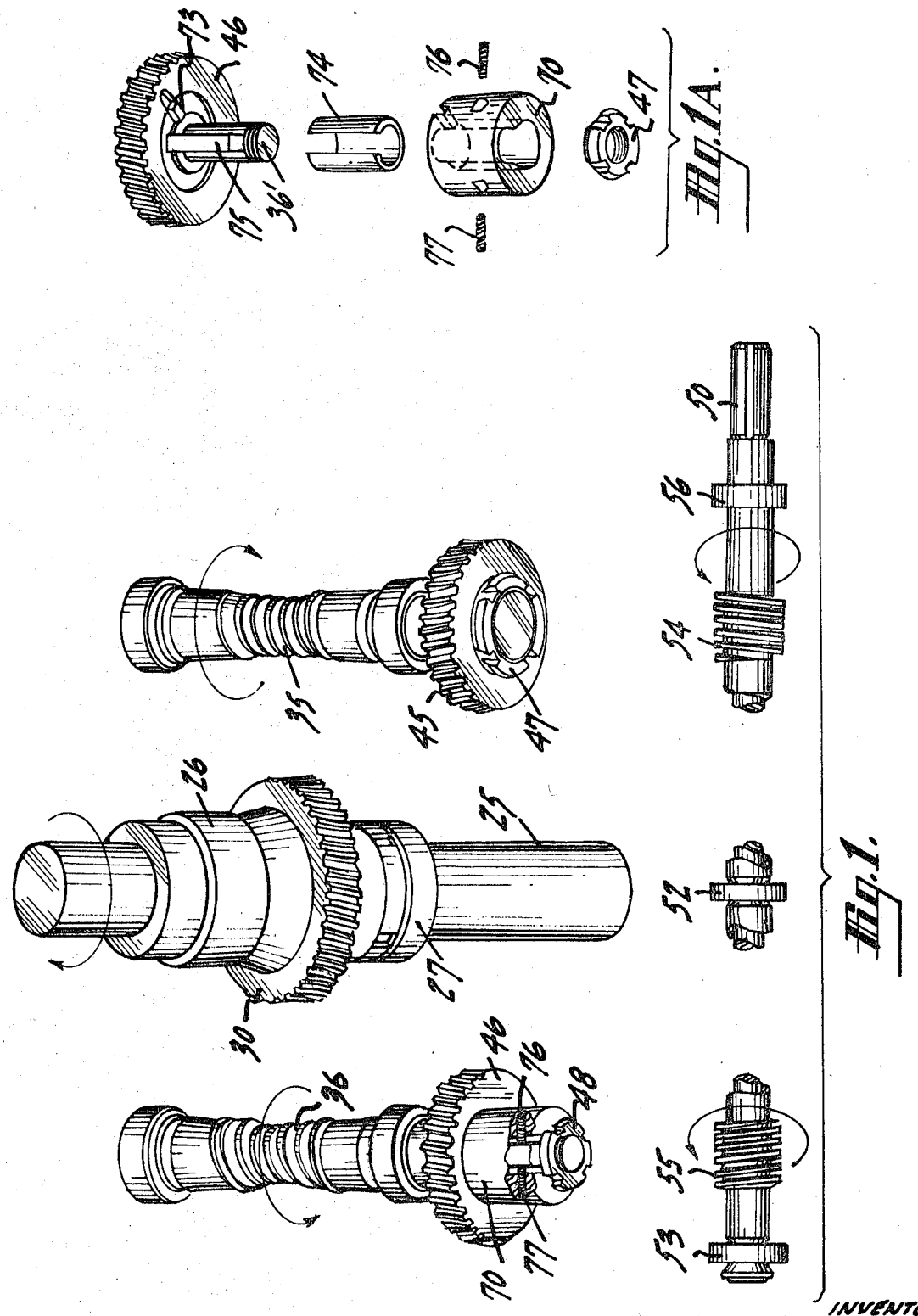
FIG. 1 is a exploded perspective of the gear mechanism made according to my invention.
Figure 2:
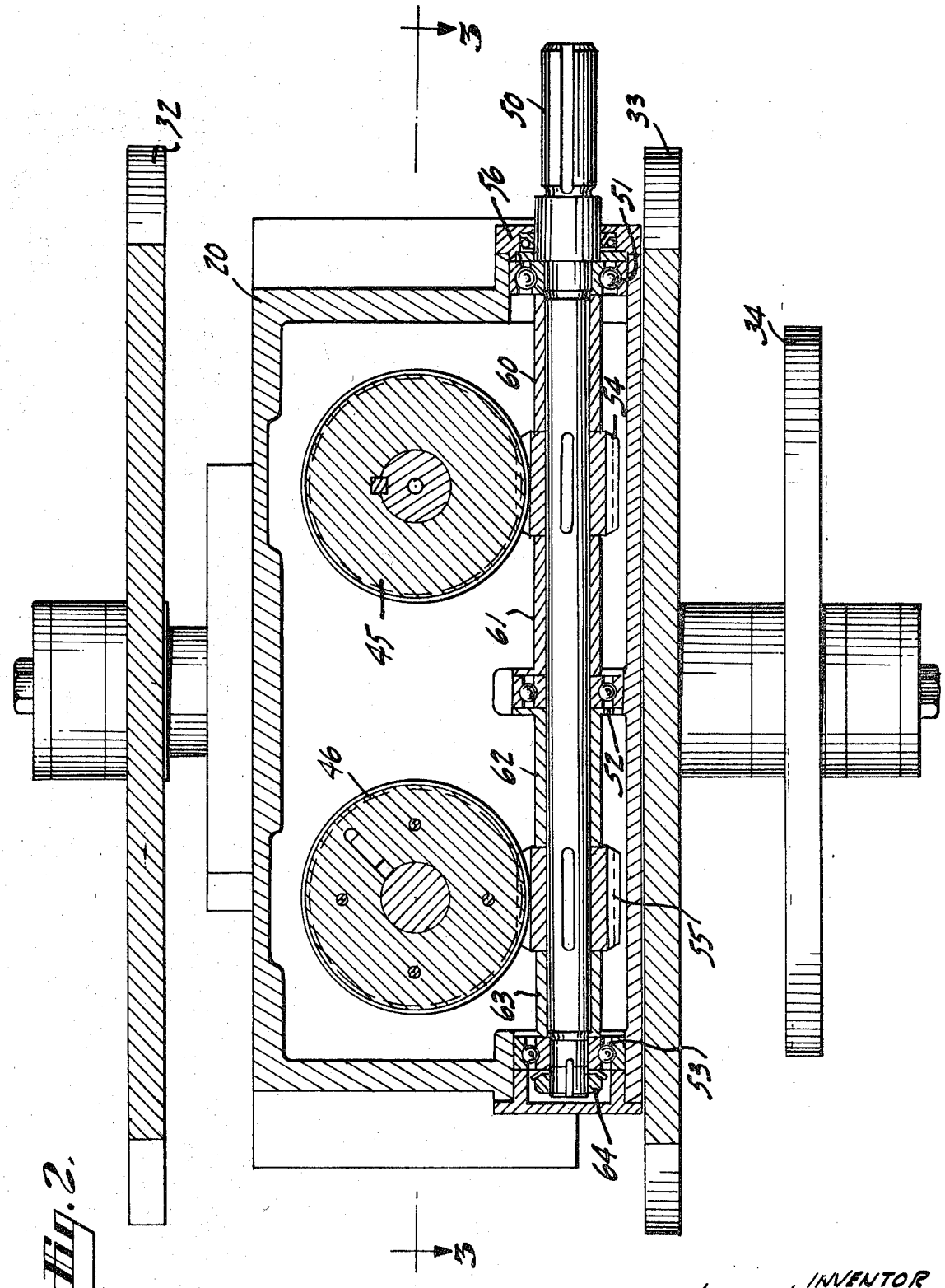
FIG. 2 is a section taken along the line 2—2 of FIG. 3.

The apparatus made according to my invention includes a gear box housing 20 which contains all of the bearing cavity bores required to support the bearings on the main cam shaft, the hour worm wheels and the main drive shaft.

The cam shaft 25 is supported by the bearings 26 and 27 supported in bearing retainers 28 and 29. The cam shaft is free to rotate in the bearings. A worm wheel 30 is fixed to the cam shaft 25 by key 31. Cams 32, 33 and 34 are fixed to the cam shaft 25.

Worm wheel 30 is engaged on opposite sides thereof by two hour glass worms or worm gears 35 and 36 supported by bearings 37, 38, 39 and 40. The bearings are held in place by bearing retainers 41, 42, 43 and 44. The worm wheel 45 is keyed to the hour glass worm 35 and cannot rotate relative to the hour glass worm. Worm wheel 46 is not keyed to the hour glass worm 36, but can be rotated, as will be described relative to the hour glass worm 36. Nuts 47 and 48 retain the hour glass worms and worm wheels together.

The main drive shaft 50 is rotatably supported in the housing 20 by means of the ball bearing assemblies 51, 52 and 53, keyed to shaft 50 are the worm gears 54 and 55 which engage the worm wheels 45 and 46. A retainer 56 maintains shaft 50 in place. Spacers 60, 61, 62 and 63 properly position the worm gears 54 and 55 in place. Lock nut 64 retains the assembly against retainer 56.

The worm wheel 46 has fixed thereto a collar 70, by means of screws 71 and 72 as shown in FIG. 3, or a key such as 73 FIG. 1a. The collar 70 and worm wheel 46 are rotatable on the end shaft 36' of the hour glass worm 36. A spacer 74 is inserted between the end shaft 36' and the collar 70. A key 75 is inserted into the end shaft. Set screws 76 and 77 adjust the angular position of worm wheel 46 on the end shaft 36' to eliminate back lash. The direction of rotation of the gears, wheels and shafts is shown in FIG. 1.

What is claimed is:
1. Mechanism for transferring power free of back lash from a drive shaft to a driven shaft, including,
 (a) a gear housing,
 (b) a drive shaft rotatably mounted in said housing,
 (c) a pair of oppositely disposed left handed and right handed worm gears on said drive shaft,
 (d) a driven shaft mounted in said housing transversely of said drive shaft and having,
 (e) a worm wheel on said driven shaft and fixed thereto,
 (f) a pair of hour glass worm assemblies oppositely disposed to said worm wheel and engaging said worm wheel on opposite sides thereof,
 (g) a worm wheel mounted on each of said hour glass worm assemblies and engaging one of said worm gears to rotate said worm assemblies in opposite directions,
 (h) one of said worm wheels being fixed on the hour glass assembly and the other being rotatably mounted on the hour glass assembly,
 (i) and means including set screws for rotatably adjusting and fixing the other of said worm wheels to its assembly to take up back lash.

2. Mechanism for transferring power free of back lash from a drive shaft to a driven shaft, including,
 (a) a gear housing,
 (b) a drive shaft rotatably mounted in said housing,
 (c) a pair of oppositely disposed left handed and right handed worm gears on said drive shaft,
 (d) a driven shaft mounted in said housing transversely of said drive shaft and having,
 (e) a worm wheel on said driven shaft and fixed thereto,
 (f) a pair of hour glass worm assemblies oppositely disposed to said worm wheel and engaging said worm wheel on opposite sides thereof,
 (g) a worm wheel mounted on each of said hour glass worm assemblies and engaging one of said worm gears to rotate said worm assemblies in opposite directions, (h) one of said worm wheels being fixed on the hour glass assembly and the other being rotatably mounted on the hour glass assembly, (i) the rotatably mounted worm wheel having a collar fixed thereto, (j) a key on the hour glass worm gear assembly supporting the rotatably mounted worm wheel, (k) and set screws on said collar and contacting said key whereby said rotatably mounted worm wheel can be angularly adjusted to eliminate back lash between the worm wheel on said driven shaft and said hour glass worm gears.

3. Mechanism for transferring power free of back lash from a drive shaft to a driven shaft, including, (a) a gear housing, (b) a drive shaft rotatably mounted in said housing, (c) a pair of oppositely disposed left handed and right handed worm gears on said drive shaft, (d) a driven shaft mounted in said housing transversely of said drive shaft and having, (e) a worm wheel on said driven shaft and fixed thereto, (f) a pair of hour glass worm assemblies oppositely disposed to said worm wheel and engaging said worm wheel on opposite sides thereof, (g) a worm wheel mounted on each of said hour glass worm assemblies and engaging one of said worm gears to rotate said worm assemblies in opposite directions, (h) one of said worm wheels being fixed on the hour glass assembly and the other being rotatably mounted on the hour glass assembly, (i) the rotatably mounted worm wheel having a collar fixed thereto, (j) a key on the hour glass worm gear assembly supporting the rotatably mounted worm wheel, (k) and set screws on said collar and contacting said key whereby said rotatably mounted worm wheel can be angularly adjusted to eliminate back lash between the worm wheel on said driven shaft and said hour glass worm gears, (l) and a plurality of cams mounted on said driven shafts.

References Cited

UNITED STATES PATENTS 3,398,595   8/1968   Clutter _____ 74—409

LEONARD H. GERIN, Primary Examiner

U.S. Cl. X.R.

74—425, 665